United States Patent
Schoor et al.

(10) Patent No.: US 12,388,562 B2
(45) Date of Patent: Aug. 12, 2025

(54) METHOD FOR LOSS REDUCTION IN A COMMUNICATION INTERFACE

(71) Applicant: Robert Bosch GmbH, Stuttgart (DE)

(72) Inventors: Michael Schoor, Stuttgart (DE); Theresa Beyer, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 172 days.

(21) Appl. No.: 17/873,077

(22) Filed: Jul. 25, 2022

(65) Prior Publication Data
US 2023/0053306 A1 Feb. 16, 2023

(30) Foreign Application Priority Data

Aug. 12, 2021 (DE) .................. 10 2021 208 822.8

(51) Int. Cl.
*H04L 1/00* (2006.01)
*H04L 12/40* (2006.01)

(52) U.S. Cl.
CPC .......... *H04L 1/0006* (2013.01); *H04L 1/0004* (2013.01); *H04L 12/40* (2013.01); *H04L 2012/40215* (2013.01)

(58) Field of Classification Search
CPC ..... H04L 1/0006; H04L 1/0004; H04L 12/40; H04L 12/40032; H04L 2012/40215; H04L 2012/40273
See application file for complete search history.

(56) References Cited

U.S. PATENT DOCUMENTS

| | | | |
|---|---|---|---|
| 2007/0279252 A1* | 12/2007 | Hellwig | G01S 13/87 340/572.1 |
| 2013/0190978 A1* | 7/2013 | Kato | H04W 8/24 455/418 |
| 2019/0180499 A1* | 6/2019 | Caulfield | G06V 20/17 |
| 2020/0285599 A1* | 9/2020 | Dadual | G06F 13/4234 |
| 2022/0046114 A1* | 2/2022 | Entelis | H04L 12/40 |
| 2022/0196735 A1* | 6/2022 | Atsatt | H03K 19/1776 |

OTHER PUBLICATIONS

"TCAN1042-Q1 Automotive Fault Protected Can Transceiver With Can Fd," Texas Instruments, 2021, pp. 1-48.

* cited by examiner

*Primary Examiner* — Mark D Featherstone
*Assistant Examiner* — Rong Tang
(74) *Attorney, Agent, or Firm* — NORTON ROSE FULBRIGHT US LLP

(57) ABSTRACT

A method for loss reduction in a communication interface having differential power loss as a function of a transmitted bit. A data format of transmitted data and/or a data format of address data that characterize the addresses of communication subscribers is selected as a function of the expected number of bits having higher power loss and/or the expected number of bits having lower power loss in the data, in such a way that the number of bits having lower power loss is increased.

9 Claims, 3 Drawing Sheets

FIG. 1
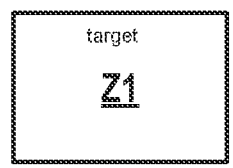
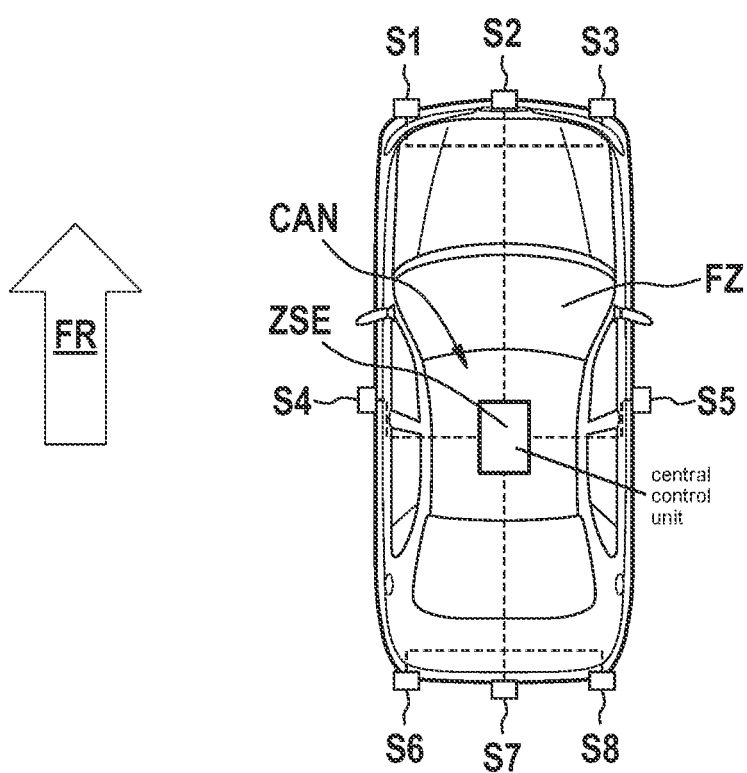

FIG. 3
(Related Art)

| S | ID (dec) | ID (bin) | N(0) |
|---|---|---|---|
| S1 | 0 | 00000000000 | 11 |
| S2 | 1 | 00000000001 | 10 |
| S3 | 2 | 00000000010 | 10 |
| S4 | 3 | 00000000011 | 9 |
| S5 | 4 | 00000000100 | 10 |
| S6 | 5 | 00000000101 | 9 |
| S7 | 6 | 00000000110 | 9 |
| S8 | 7 | 00000000111 | 8 |

FIG. 4

| S | ID (dec) | ID (bin) | N(0) |
|---|---|---|---|
| S1 | 2047 | 11111111111 | 0 |
| S2 | 2046 | 11111111110 | 1 |
| S3 | 2045 | 11111111101 | 1 |
| S4 | 2043 | 11111111011 | 1 |
| S5 | 2039 | 11111110111 | 1 |
| S6 | 2031 | 11111101111 | 1 |
| S7 | 2015 | 11111011111 | 1 |
| S8 | 1983 | 11110111111 | 1 |

METHOD FOR LOSS REDUCTION IN A COMMUNICATION INTERFACE

CROSS REFERENCE

The present application claims the benefit under 35 U.S.C. § 119 of German Patent Application No. DE 10 2021 208 822.8 filed on Aug. 12, 2021, which is expressly incorporated herein by reference in its entirety.

FIELD

The present invention relates to a method for loss reduction in a communication interface having differential power loss as a function of the transmitted bits, in which a data format of transmitted data and/or address data is selected as a function of the expected number of bits having higher power loss and/or the expected number of bits having lower power loss.

BACKGROUND INFORMATION

Communication interfaces that transmit bits electronically are currently in wide use. They are used for example in automotive engineering, in the design of machines and plants, and in automation technology.

An example of such a communication interface is the CAN bus (Controller Area Network), standardized in ISO 11898-1. The CAN bus is a field bus system in which a plurality of so-called field bus modules are connected to a central control device via the CAN bus. Terminal devices are in turn connected to the field bus modules. The terminal devices connected to the field bus system are referred to as bus subscribers. In CAN buses, two different bits are used that cause different current consumption in the bus subscribers. The bits are divided into so-called dominant bits and recessive bits. The dominant bits are a logical zero and impress a current onto the bus subscriber. The recessive bits are a logical one, and reach the central control unit only when no dominant bit is sent.

CAN buses are used for example in vehicle construction to connect a multiplicity of radar sensors. If a current is impressed on the radar sensor, as bus subscriber, based on the dominant bits, this results in an increased power loss. Here, the loss occurs in the driver module for the CAN bus. The higher power loss results either in higher costs for heat dissipation or more expensive circuits that, so as not to increase the overall loss, include switching components having lower losses.

SUMMARY

In accordance with the present invention, a method is provided for loss reduction in a communication interface. The communication interface connects a multiplicity of communication subscribers, such as sensors, in particular radar sensors, and other devices. In accordance with an example embodiment of the present invention, in this method, on the one hand transmitted data that are transmitted by the communication subscribers, in particular measurement data transmitted for example by the sensors, are of interest. On the other hand, address data that characterize the addresses (also designated ID) of the communication subscribers and/or the addresses of the messages of the communication subscribers—i.e. the sent data packets—are of interest.

The communication interface has differing power loss as a function of the transmitted bits. For example, the communication interface can have a higher or lower power loss in the transmission of a bit having logical one than in the case of a bit having logical zero. As a function of the data format of the respective data, in practice typically either the bits with higher power loss or the bits with lower power loss occur more frequently. Depending on the application, the expected number of bits having higher power loss, or the expected number of bits having lower power loss, in the respective data format can be estimated. The estimation can be carried out already during the design, during the construction, or during the installation of the communication interface, or can take place later, for example through updates of the communication interface.

It is provided to select the data format of the transmitted data and/or the data format of the address data, as a function of the expected number of bits with higher power loss and/or the expected number of bits with lower power loss in the data in the application, in such a way that the number of bits with lower power loss is increased for the selected data format. Preferably, the number of bits with lower power loss is maximized.

Through the suitable selection of the data format, in this way the number of bits with lower power loss becomes greater. Consequently, the power loss during transmission is reduced.

The reduced power loss during transmission confers the following advantages: the overall power loss of the communication subscribers is reduced, which results in higher quality. Alternatively, the overall power loss of the communication subscribers can be kept the same. In this way, the supply voltage can be provided more easily and at lower cost. This can be realized for example through lower-cost components having higher losses, or through modified circuit topologies, such as linear regulators instead of switching regulators, which have a higher efficiency. Finally, lower-cost mechanical components can be used that may have poorer thermal properties. In this way, the costs for the communication interface can be reduced.

In general, the method can be used in any communication interface whose power loss is a function of the transmitted bits. Such a communication interface may be for example a field bus. Specifically, the communication interface is a CAN bus having dominant bits (logical zero) and recessive bits (logical one). The dominant bits are the bits having higher power loss and the recessive bits are the bits having lower power loss. The CAN bus connects a multiplicity of bus subscribers to a central control device. The bus subscribers are the above-named communication subscribers. As a function of the data format of the respective data, in practice typically either the dominant bits or the recessive bits occur more frequently. For example, integers having a large word width (therefore having many bits) and small values have a large number of leading zeros, and thus a large number of dominant bits.

In accordance with an example embodiment of the present invention, the method for loss reduction in a CAN bus provides that the data format of the transmitted data and/or the data format of the address data be selected, as a function of the expected number of the dominant bits and/or the expected number of the recessive bits in the data in the application, in such a way that the number of the recessive bits in the data is increased for the selected data format. Preferably, the number of recessive bits is maximized. Because the recessive bits result in a lower current consumption compared to the dominant bits (for example, according to data sheet TCAN1042-Q1, the current consumption is reduced by 75 mA), the increase in the number of the recessive bits and the simultaneous reduction of the number of the dominant bits during transmission results in a lower overall current. Along with this, the power loss that arises during transmission is reduced; in the present case, given a voltage of 5 V, the power loss is reduced by 375 mW.

For the case in which the transmitted data are measurement data, e.g. of sensors, the data format of the measurement data is preferably selected as a function of the type of measurement and/or the type of the evaluation of the measurement data. For example, the data format can be selected as a function of whether measurement data are used to ascertain a distance or to ascertain a relative speed. Alternatively or in addition, the data format of the measurement data is selected as a function of the position of the bus subscribers, e.g. of the sensors.

In accordance with an example embodiment of the present invention, the distance is typically outputted as an integer not having a sign, and having fixed scaling. In the conventionally used data format, shorter distances are given small numerical values and larger distances are given higher numerical values. Typically, in the distance measurement more targets are acquired in the near environment than are targets at a greater distance. Thus, in the conventional data format the many near targets are assigned low values, which in the binary representation have a large number of leading zeros. If the logical zero corresponds to a bit having higher power loss, as is the case in the CAN bus for the dominant bits, there thus results a large number of bits having higher power loss in the transmission. According to the present invention, a data format can now be selected that inverts the bits before the transmission. Consequently, the leading zeros will correspond to leading ones, which then correspond to bits having lower power loss, as in the case in the CAN bus for recessive bits.

In the measurement of the relative speed, signed integers are used. For front sensors, oriented in the direction of movement, most targets typically have a negative relative speed, including in particular all stationary targets that remain in a fixed position while the sensor moves towards them. For rear sensors, which are oriented opposite the direction of movement, most targets typically have a positive relative speed. Conventionally, a representation having a ones' complement is used for the measurement data of the relative speed. For the measurement of the front sensors, which predominantly measure relative speeds having a negative sign, this data format is already optimal if the logical zero corresponds to a bit having higher power loss. For the measurement of the rear sensors, which predominantly measure relative speeds having a positive sign, according to the present invention a data format can be selected that inverts the bits before the transmission. In this way, other data formats are selected as a function of the position of the sensors, namely on the front or on the rear. If the direction of movement changes, for example when traveling in reverse, then it can be provided not to invert the measurement data of the rear sensors.

Preferably, in accordance with an example embodiment of the present invention, the selected data format is communicated to an electronic control device that controls the communication interface. In the case of the CAN bus, this is the central control unit. For this purpose, during the transmission an additional bit can be provided that for example indicates the inversion. In this way, the electronic control device can correctly interpret the measurement data. This is of particular interest above all in the case named above, in which the measurement data are inverted, or not, as a function of the position and possibly of the direction of movement. In general, a plurality of bits can also be used to indicate the data format. Due to the large number of detections to be transmitted, the number of bits that are converted through the change of the data format from bits with higher power loss to bits with lower power loss is in practice generally significantly greater than the number of bits for indicating the data format, in particular if only one bit is used for this purpose.

If the data format provides a standard value (default value) for unused values inside a data packet, the standard value is preferably selected as a function of the expected number of the bits having higher power loss and/or the expected number of bits having lower power loss in the data, in such a way that for the standard values the number of bits with lower power loss is increased for the selected data format. For example, in distance measurement by a sensor, all data of the detections are always transmitted regardless of how many detections the sensor has actually acquired. The standard value can now be defined for detections that were not acquired. Merely as an example, such a standard value can be made up only of bits having lower power loss. In the case of a CAN bus, the standard value can for example be made up only of ones, and can thus have only recessive bits.

For the case in which a data compression method is used having a so-called dictionary in the transmission of the data, such as e.g. Huffman coding, the dictionary is preferably selected as a function of the expected number of bits having higher power loss and/or the expected number of bits having lower power loss in the data, in such a way that the number of bits with lower power loss is increased. In particular, the frequency distribution of the words is taken into account, and in the realization the frequency of the bits with higher power loss is reduced. Here it can also be provided not to reduce the data quantity, or even to increase it, if the overall system permits this, if the number of bits having higher power loss is at the same time reduced.

With regard to address data, it is preferably provided to select the addresses/IDs of the bus subscribers on the basis of an assignment table. The assignment table assigns a specific address/ID to each subscriber. Alternatively or in addition, the addresses/IDs of messages, i.e. of sent data packets, of the subscribers can be selected on the basis of an assignment table. The assignment table then assigns a specific address/ID to different messages, or data packets, of each subscriber. Here, in the assignment table preferably only values for the addresses/IDs are used that, in the binary representation, contain as few bits having higher power loss as possible, and particularly preferably only values that, in the binary representation, contain only at most one bit having higher power loss (so-called 1-of-n encoding, or one-hot encoding).

In accordance with an example embodiment of the present invention, the computer program is set up to carry out each step of the method in particular when it is executed on an electronic control device of the communication interface. It enables the implementation of the method in a conventional electronic control device without having to make constructive modifications thereto. For this purpose, it is stored on the machine-readable storage medium.

In accordance with an example embodiment of the present invention, by running the computer program on a conventional electronic control device of the communication interface, an electronic control device is obtained that is set up to select a data format of transmitted data and/or a data format of address data as a function of the expected number of bits having higher power loss and/or the expected number of bits having lower power loss in the data, in such a way that the number of bits having lower power loss predominates, thus reducing the power loss of the communication interface.

BRIEF DESCRIPTION OF THE DRAWINGS

Exemplary embodiments of the present invention are shown in the figures and are explained in more detail in the following description.

FIG. 1 shows a schematic representation of a vehicle having radar sensors and having a CAN bus via which the radar sensors are connected, as well as detected targets.

FIG. 3 shows an assignment table for addresses according to the related art.

FIG. 4 shows an assignment table for addresses according to a specific embodiment of the method according to the present invention.

DETAILED DESCRIPTION OF EXAMPLE EMBODIMENTS

Figure 2:
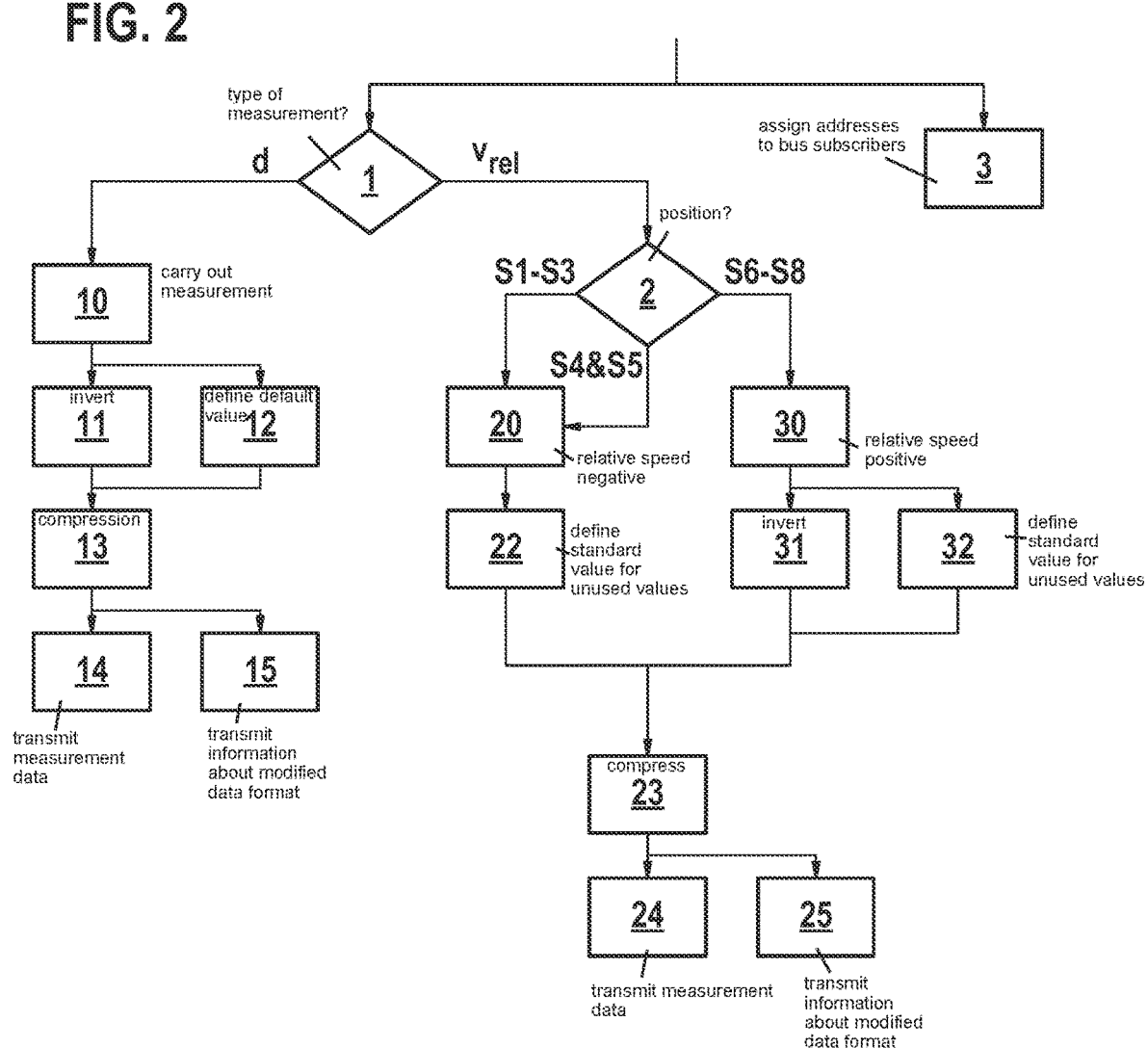
FIG. 2 shows a flow diagram of a specific embodiment of the method according to the present invention.

FIG. 1 shows a schematic representation of a vehicle FZ moving in direction of travel FR. The vehicle has a CAN bus CAN, and has for example eight radar sensors S1-S8. The eight radar sensors S1-S8 are connected via the CAN bus CAN to a central control unit ZSE of the CAN bus CAN. In addition, as examples targets Z1-Z3 are shown that are detected by radar sensors S1-S8. In this example, front sensors S1-S3, oriented in travel direction FR, acquire targets Z1 & Z2 in front of vehicle FZ, and the oppositely oriented rear sensors S6-S8 acquire target Z3 behind vehicle FZ. Radar sensors S1-S8 can on the one hand carry out a measurement of the distance to the targets Z1-Z3, and can on the other hand carry out a measurement of the relative speed of the targets Z1-Z3 relative to vehicle FZ.

FIG. 2 shows a flow diagram of a specific embodiment of the method according to the present invention. On the one hand, the data format for measurement data of radar sensors S1-S8 is modified (left path); this is described below. On the other hand, the data format of the address data is modified (right path); this is also described below with reference to FIGS. 3 and 4.

At the beginning, there takes place a query 1 of the type of the measurement, i.e., whether measurement data are recorded in a distance measurement (identified with "d") or in a measurement of the relative speed (identified with "$v_{rel}$"). In the distance measurement, a measurement 10 is carried out by all radar sensors S1-S8, and the distance to each of the targets Z1-Z3 is measured. The measurement data obtained in measurement 10 are in the form of unsigned integers having a fixed scaling, each assigned to the distance. Conventionally, smaller distances are given small numerical values and larger distances are given higher numerical values. Thus, for example the distance of target Z1 of 31.25 m corresponds to the number 8192 (in the decimal system), and the distance of target Z2, which is 250 m, corresponds to the number 65535 (in the decimal system). Due to the attenuation of the radar waves, the frequency of detections with smaller distance is greater than for larger distances. However, the smaller distances have small numerical values that, in the binary representation, have a large number of leading zeros, and thus result in a large number of dominant bits in the transmission.

According to the present invention, the data format of the measurement data is now modified. For this purpose, on the one hand the measurement data are inverted 11. As a result, the numerical values for the smaller distances obtain, instead of the leading zeros, a large number of leading ones, and thus result in more recessive bits in the transmission. In addition, a standard value (default value) for unused values is defined 12. 128 detections are always transmitted, regardless of how many detections the radar sensors have actually measured. The standard value for unused values can for example contain only ones, which results in only recessive bits in the transmission. The standard value can also be defined 12 in advance at any time. In this exemplary embodiment, in addition a compression 13 using a dictionary takes place, e.g. a Huffman coding. The dictionary is selected for the compression 13 in such a way that the frequency of the dominant bits is reduced.

Finally, the measurement data, in the modified data format, are transmitted 14 to central control unit ZSE via CAN bus CAN. At the same time, a transmission 15 can also take place of information about the modified data format to central control unit ZSE via CAN bus CAN. In the simplest case, the inversion of measurement data 11 is indicated via a bit. Central control unit ZSE can now process the measurement data in the modified data format as well.

In the measurement of the relative speed $v_{rel}$, first a query 2 is made about the position of the measuring sensors, i.e. whether the measurement takes place using front sensors S1-S3, side sensors S4 & S5, or rear sensors S6-S8. If a measurement 20 is carried out by front sensors S1-S3, then the relative speed of most targets Z1, Z2 in front of vehicle FZ will be negative due to the speed of vehicle FZ in the direction of travel FR, especially when the targets are stationary, as is the case most frequently in practice. The measurement data obtained in measurement 20 are conventionally in the form of signed integers, in a representation having a ones' complement. These measurement data are already inverted due to the negative sign in the ones' complement. Thus, they have a large number of leading ones, which results in a large number of recessive bits in the transmission. Here, only one standard value is defined 22 for unused values. For this, see the above description.

If a measurement 30 is carried out by rear sensors S1-S3, then the relative speed of most targets Z3 behind vehicle FZ will be positive due to the speed of vehicle FZ in the direction of travel FR, especially when the targets are stationary, as is the case most frequently in practice. The measurement data obtained in measurement 30 are conventionally also in the form of signed integers in the representation having a ones' complement. These measurement data are however not inverted, due to the positive sign in the ones' complement. Here it is provided to invert 31 the measurement data. After the inversion 31, the measurement data finally have a large number of leading ones, which results in a large number of recessive bits in the transmission. In addition, analogous to the front sensors, a standard value for unused values is defined 32. For this, reference is made to the above description.

For side sensors S4 & S5, there is no preferred direction of the relative speed, because targets Z1-Z3 may be situated both in front of vehicle FZ and behind vehicle FZ, or may pass from one to the other when driving by. With regard to the method according to the present invention, in principle the side sensors may be treated as front sensors or as rear sensors. In the specific embodiment shown here, side sensors S4 and S5 are treated as front sensors, and carry out measurement 20. In this case, no inversion of the measurement data takes place.

In general, the sequence of the measurements 20 or 30 and query 2 is not defined. Thus, query 2, for which the measurement belongs to sensors S1-S3, S4 & S5, S6-S8, can also be carried out after measurement 20 or 30. In addition, the standard value can likewise also be defined 22 or 32 in advance at any time.

Finally, the measurement data, in the modified data format, are transmitted 24 to central control unit ZSE via CAN bus CAN. At the same time, a transmission 25 takes place of information about the modified data format to central control unit ZSE via CAN bus CAN. In the simplest case, the inversion of measurement data 31 is indicated via a bit. In this way, central control unit ZSE can distinguish whether the measurement data originate from front sensors S1-S3 (and side sensors S4 & S5), and are thus inverted due to the ones' complement and have a negative sign, or originate from rear sensors S6-S8 and were thus inverted 31 based on the method according to the present invention, and have positive signs, so that central control unit ZSE can now process the measurement data in the modified data format as well.

In other exemplary embodiments not shown, at the beginning a common measurement of the distance d and the relative speed $v_{rel}$ of all radar sensors S1-S8 takes place. In this case, there subsequently instead takes place a query 1 of the type of an evaluation, i.e., which part of the measurement data is used to ascertain the distance d and which part is used to ascertain the relative speed $v_{rel}$. Measurements 10, 20, and 30 are accordingly omitted, and instead the corresponding part of the measurement data is used. For example, for query 2 of the measuring sensors, the part of the measurement data for the respective sensors is selected.

In FIGS. 3 and 4, assignment tables for the addresses (also designated ID) of the bus subscribers, i.e. of sensors S1-S8 (here also designated S) are shown. In each table, in each case the sensors S, their address ID as a decimal number (identified by "dec") and as an 11-place binary number (identified by "bin") and the number of zeros N(0) of the binary number are listed. FIG. 4 shows an assignment table that is used for an assignment 3 (see FIG. 2) of the addresses ID to the bus subscribers according to the method of the present invention. FIG. 3 shows, for comparison, a conventional assignment table known from the existing art. In the conventional assignment table, the addresses ID are, in the simplest case, assigned to sensors S in an increasing sequence beginning from the number 0 (dec). Overall, in this way for the eight sensors S1-S8 there results an overall number of zeros, and thus of the dominant bits, of 76. If, in contrast, the addresses ID are assigned to the sensors S in a decreasing sequence beginning from the number 2047 (dec), then in this way the overall number of zeros for the eight sensors S1-S8 is reduced to 12.

FIG. 4 shows the preferred assignment table using the 1-of-n encoding (also referred to as one-hot encoding). Here, the addresses ID are assigned to the sensors S in such a way that each of their values, in the binary representation, contains at most one zero, each migrating one position towards the front. For the eight sensors S1-S8, there results a total number of 7 zeros.

In the same way, assignment tables can also be provided for the addresses of the messages, i.e. of the transmitted data packets, of the bus subscribers.

In the following, the loss reduction is shown on the basis of a numerical example for an exemplary CAN bus. It is to be noted that in practice there occur fluctuations and uncertainties that are a function of the bus used, the temperature, and/or other properties of the chip. On this, see also the data sheet TCAN1042-Q1. The transmission rate of the CAN bus (also referred to as bus speed) is on average 1 MB per second, i.e. $10^6$ bits per second. Thus, the time duration for which a bit is impressed onto the bus is 1 μs. The power loss per bad bit is calculated to be 0.375 μW $$(375 \text{ mW}/(1 \cdot 10^6 \frac{1}{s}) \cdot \frac{1}{s}),$$

if this bit is transmitted once per second. During measurement, a plurality of detections are recorded. A multiplicity of parameters belong to a detection, such as distance, relative speed, azimuth angle, elevation angle, the back-scatter cross-section (BSCS), and others, which yield for example a data set of a total of 256 bits as the sum of the word widths of the individual parameters.

In practice, other values for the number of bits per detection may occur, as a function of the number of subscribers and the bus speed. If, for example, 180 detections per measurement are transmitted, then the overall data packet of all detections together is made up of 46080 bits (180·256 bits). On average, 20 measurements per second are carried out by the radar sensors. Thus, 921600 bits (20·46080 bits) are transmitted in one second via the CAN bus. As described above, the CAN bus has a transmission rate of 1 MB per second.

If there is an improvement of 1 bit per measurement, that is 20 bits per second, and thus 7.5 μW $$(20 \cdot 375 \text{ mW}/(1 \cdot 10^6 \frac{1}{s}) \cdot \frac{1}{s}).$$

If there is an improvement of 1 bit per detection, that is 3600 bits (20·180) per second, and thus 1.35 mW $$(3600 \cdot 375 \text{ mW}/(1 \cdot 10^6 \frac{1}{s}) \cdot \frac{1}{s}).$$

If there is an improvement of 12 bits per detection (6 in the distance measurement and 6 in the measurement of the relative speed), that is 43200 bits (12·20·180) per second, and thus 16.2 mW $$(43200 \cdot 375 \text{ mW}/(1 \cdot 10^6 \frac{1}{s}) \cdot \frac{1}{s}).$$

If there is an improvement of 50 bits per detection (i.e. roughly 20% of the bits), that is 108000 bits (50·20·180) per second, and thus 40.5 mW $$(108000 \cdot 375 \text{ mW}/(1 \cdot 10^6 \frac{1}{s}) \cdot \frac{1}{s}).$$

If there is an improvement of 128 bits per detection (i.e. 50% of the bits—this can be achieved through the additional selection of the standard values), that is 276480 bits (128·20·180) per second, and thus 103.68 mW $$(276480 \cdot 375 \text{ mW}/(1 \cdot 10^6 \frac{1}{s}) \cdot \frac{1}{s})$$

What is claimed is:

1. A method for providing loss reduction in a communication interface having differential power loss as a function of transmitted bits, the method comprising:
selecting: (i) a data format of transmitted data to be transmitted using the communication interface, or (ii) a data format of address data that characterize: (a) addresses of communication subscribers or (b) addresses of messages of the communication subscribers, wherein the selecting of the data format of the transmitted data or the data format of the address data is a function of: (i) an expected number of bits, in the transmitted data or the address data, having higher power loss during transmission of the transmitted data or the address data, or (ii) an expected number of bits, in the transmitted data or the address data, having lower power loss during transmission of the transmitted data or the address data, wherein the data format is selected so that a number of bits within the transmitted data or the address data having the lower power loss during transmission is increased and a number of bits within the transmitted data or the address data having the higher power loss during transmission is decreased, wherein the communication interface is a CAN bus, wherein dominant bits on the CAN bus are the bits having the higher power loss and recessive bits on the CAN bus are the bits having the lower power loss, wherein each dominant bit of the dominant bits represents a logical zero and each recessive bit of the recessive bits represents a logical one, and wherein the higher power loss and the lower power loss are power losses in a bus driver module for the CAN bus during transmission of the transmitted data or the address data;
wherein the addresses of the communication subscribers or the addresses of messages of the communication subscribers are selected based on an assignment table using 1-of-n encoding, wherein the one-of-n encoding encodes log 2n bits in a code-word of n bits, and wherein the communication subscribers include a plurality of sensors, wherein the addresses are assigned to the sensors to uniquely identify each sensor, wherein all of the addresses assigned to the sensors, in a binary representation, contains a plurality of bits including at most one zero.

2. The method as recited in claim 1, wherein the selecting includes selecting the data format of the transmitted data, wherein the transmitted data are measurement data, and the data format of the measurement data is selected as a function of a type of measurement that the measurement data represents, wherein the type of measurement is a distance measurement or a relative speed measurement.

3. The method as recited in claim 1, wherein the selected data format is communicated to an electronic control device that controls the communication interface.

4. The method as recited in claim 1, wherein the selecting includes selecting the data format of the transmitted data, and wherein a standard value for unused values within the data format is selected, as a function of: (i) the expected number of bits in the transmitted data having the higher power loss during transmission of the transmitted data, or (ii) the expected number of bits in the transmitted data having the lower power loss during transmission of the transmitted data, the standard value being selected so that the number of bits having the lower power loss during transmission is increased.

5. The method as recited in claim 1, wherein the selecting includes selecting the data format of the transmitted data, and wherein a data compression method is used, the data compression method having a dictionary, the dictionary being selected based on the expected number of bits in the transmitted data having the higher power loss during transmission of the transmitted data, or the expected number of bits in the transmitted data having lower power loss during transmission of the transmitted data, so that the number of bits in the transmitted data having the lower power loss during transmission of the transmitted data is increased.

6. The method as recited in claim 1, wherein the transmitted data include measurement data from a radar sensor in a vehicle, wherein an expected number of bits in the measurement data having the higher power loss during transmission is higher than an expected number of bits in the measurement data having the lower power loss during transmission, and the data format for the transmitted data is selected so as to invert the measurement data so that the number of bits within the transmitted data having the lower power loss during transmission of the transmitted data is increased and the number of bits within the transmitted data having the higher power loss during transmission of the transmitted data is decreased.

7. The method as recited in claim 1, wherein the selecting of the data format of the transmitted data or the address data includes selecting the data format of the transmitted data, wherein the transmitted data are measurement data, and the data format of the measurement data is selected as a function of a position of sensors in a vehicle that provide the measurement data, wherein the data format for the transmitted data is selected so as to invert measurement data from a sensor located in a first end of the vehicle and so as not to invert measurement data from a sensor located in a second end of the vehicle, the first end being an opposite end of the vehicle relative to the second end.

8. A non-transitory machine-readable storage medium, on which is stored a computer program, which is executable by a processor of an electronic control device, comprising:
a program code arrangement having program code for providing loss reduction in a communication interface having differential power loss as a function of transmitted bits, by performing the following:
selecting: (i) a data format of transmitted data to be transmitted using the communication interface, or (ii) a data format of address data that characterize: (a) addresses of communication subscribers or (b) addresses of messages of the communication subscribers, wherein the selecting of the data format of the transmitted data or the address data is a function of: (i) an expected number of bits, in the transmitted data or the address data, having higher power loss during transmission of the transmitted data or the address data, or (ii) an expected number of bits, in the transmitted data or the address data, having lower power loss during transmission of the transmitted data or the address data, the data format being selected so that a number of bits in the transmitted data or the address data, having lower power loss during transmission is increased and a number of bits within the transmitted data or the address data having the higher power loss during transmission is decreased, wherein the communication interface is a CAN bus, wherein dominant bits on the CAN bus are the bits having the higher power loss and recessive bits on the CAN bus are the bits having the lower power loss, wherein each dominant bit of the dominant bits represents a logical zero and each recessive bit of the recessive bits represents a logical one, and wherein the higher power loss and the lower power loss are power losses in a bus driver module for the CAN bus during transmission of the transmitted data or the address data;

wherein the addresses of the communication subscribers or the addresses of the messages of the communication subscribers are selected based on an assignment table using 1-of-n encoding, wherein the one-of-n encoding encodes log 2n bits in a code-word of n bits, and wherein the communication subscribers include a plurality of sensors, wherein the addresses are assigned to the sensors to uniquely identify each sensor, wherein all of the addresses assigned to the sensors, in a binary representation, contains a plurality of bits including at most one zero.

9. An electronic control apparatus for providing loss reduction in a communication interface having differential power loss as a function of transmitted bits, comprising:

an electronic control device configured to perform the following:

selecting: (i) a data format of transmitted data to be transmitted using the communication interface, or (ii) a data format of address data that characterize: (a) addresses of communication subscribers or (b) addresses of messages of the communication subscribers, wherein the selecting of the data format of the transmitted data or the address data is a function of: (i) an expected number of bits, in the transmitted data or the address data, having higher power loss during transmission of the transmitted data or the address data, or (ii) an expected number of bits, in the transmitted data or the address data, having lower power loss during transmission of the transmitted data or the address data, the data format being selected so that a number of bits in the transmitted data or the address data, having lower power loss during transmission is increased and a number of bits within the transmitted data or the address data having the higher power loss during transmission is decreased, wherein the communication interface is a CAN bus, wherein dominant bits on the CAN bus are the bits having the higher power loss and recessive bits on the CAN bus are the bits having the lower power loss, wherein each dominant bit of the dominant bits represents a logical zero and each recessive bit of the recessive bits represents a logical one, and wherein the higher power loss and the lower power loss are power losses in a bus driver module for the CAN bus during transmission of the transmitted data or the address data;

wherein the addresses of the communication subscribers or the messages of the communication subscribers are selected based on an assignment table using 1-of-n encoding, wherein the one-of-n encoding encodes log 2n bits in a code-word of n bits, and wherein the communication subscribers include a plurality of sensors, wherein the addresses are assigned to the sensors to uniquely identify each sensor, wherein all of the addresses assigned to the sensors, in a binary representation, contains a plurality of bits including at most one zero.

* * * * *